United States Patent [19]

Lindvay

[11] 4,028,333
[45] June 7, 1977

[54] FLAME RETARDANT POLYMERIC COMPOSITIONS CONTAINING MELAMINE HYDROHALIDES

[75] Inventor: Michael W. Lindvay, Ann Arbor, Mich.

[73] Assignee: Velsicol Chemical Corporation, Chicago, Ill.

[22] Filed: Dec. 18, 1975

[21] Appl. No.: 642,012

[52] U.S. Cl. .......................... 260/45.8 NT; 252/8.1; 260/45.7 P; 260/45.75 B
[51] Int. Cl.² .......................................... C08K 5/34
[58] Field of Search ........ 260/45.8 NT; 106/15 FP; 428/921

[56] References Cited

UNITED STATES PATENTS

| | | | |
|---|---|---|---|
| 1,966,271 | 7/1934 | Twiss et al. | 428/921 |
| 2,032,605 | 3/1936 | Whitehead | 428/921 |
| 3,660,344 | 5/1972 | Michael et al. | 260/37 |
| 3,666,715 | 5/1972 | Kutner | 260/45.8 NT;45.8 |
| 3,793,289 | 2/1974 | Koch et al. | 260/45.8 |
| 3,816,367 | 6/1974 | Larkin et al. | 260/29.6 |
| 3,819,575 | 6/1974 | Green | 260/45.75 |
| 3,843,650 | 10/1974 | Pews et al. | 260/248 |
| 3,936,420 | 2/1976 | Gray | 260/45.8 NT;45.8 |

OTHER PUBLICATIONS

Bann et al., Chemical Reviews, vol. 58, 1958, pp. 135 and 136.

Smolin et al., s–Triazines and Derivatives, 1959, pp. 322-324.

Primary Examiner—Melvyn I. Marquis
Assistant Examiner—R. A. White
Attorney, Agent, or Firm—Robert M. Phipps; Myron B. Kapustij

[57] ABSTRACT

Polymeric compositions comprising a polyolefin polymer and a flame retarding amount of a compound of the formula

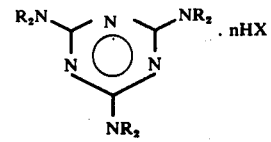

wherein each R is independently selected from a group consisting of hydrogen, alkyl, halogenated alkyl, phenyl, and halogenated phenyl groups, said alkyl groups containing from 1 to about 6 carbon atoms and said halogenated groups containing from 1 to about 5 halogen substituents per group, said halogen substituents selected from a group comprising chlorine and bromine; wherein X is selected from a group comprising chlorine and bromine; and wherein *n* is an integer from 1 to 3, and mixtures thereof.

11 Claims, No Drawings

FLAME RETARDANT POLYMERIC COMPOSITIONS CONTAINING MELAMINE HYDROHALIDES

BACKGROUND OF THE INVENTION

1. Field of the Invention

The invention disclosed herein pertains to polymeric compositions containing a flame retarding amount of a substituted s-triazine compound.

2. Description of the Prior Art

During the past several years, a large number of flame retardants have been developed for use with an almost equally large number of flammable materials. Cellulosic materials such as paper and wood, and polymeric materials such as synthetic fibers and bulkier plastic articles are just two examples of the materials for which flame retardants have been developed. For any class of flammable materials, such as synthetic high polymers, those skilled in the art have long been aware that some flame retardant additives are more effective in polymers and polymeric compositions than other flame retardant additives. This is because the efficacy of any flame retardant in polymers or polymeric compositions is measured not only by the flame retarding capability of the additive but also by the ability of the additive to improve or modify, or at least not to detract from, other physical or mechanical properties of the polymer or polymeric composition. The mere fact, therefore, that most flame retardants contain halogen, phosphorus, and/or nitrogen atoms does not assure that any given halogenated or phosphorus or nitrogen-containing compound will impart useful flame retarding characteristics to all or even to any polymeric systems. Furthermore, as those skilled in the art have improved the flame retardance of many polymeric materials, they have been simultaneously required to provide the necessary flame retardancy with a minimal effect upon other properties of the polymers such as their light stability, processability and flexural, tensile and impact strengths. Balancing all of the foregoing considerations and thereby developing polymeric compositions with good flame retardant characteristics as well as a satisfactory balance of other properties is, consequently, a task which has in the past and presently continues to require the exercise of a high degree of inventive skill.

In contrast to the present invention which lies within the art of flame retardants, Br. Pat. No. 1,215,286 discloses an intumescent paint composed of melamine hydrobromide, a zinc oxide fluxing agent, and an epoxide resin. Although both the flame retardant art and the intumescent art have as their ultimate aim a reduction of the hazards associated with fires and combustion, said arts approach their objective through divergent techniques because of the different theories and mechanisms under which they operate. Because of these fundamental differences between the two arts, one skilled in the art of flame retardants recognizes that one cannot indiscriminately take an intumescent composition and expect it to possess flame retardant efficacy when incorporated into, as opposed to being applied onto, a polymeric substrate. A great degree of inventive skill is required to successfully affect such a transposition.

SUMMARY OF THE INVENTION

A polymeric composition comprising a polyolefin polymer and a flame retarding amount of a compound of the formula

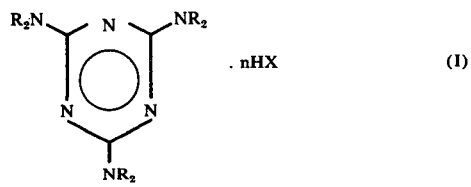

wherein each R is independently selected from a group consisting of hydrogen, alkyl, halogenated alkyl, phenyl, and halogenated phenyl groups, said alkyl groups containing from 1 to about 6 carbon atoms and said halogenated groups containing from 1 to about 5 halogen substituents per group, said halogen substituents selected from a group comprising chlorine and bromine; and wherein x is selected from a group comprising chlorine and bromine; and wherein n is an integer from 1 to 3, and mixtures thereof.

DESCRIPTION OF THE PREFERRED EMBODIMENTS

The flame retardant compounds within the scope of this invention have the formula I above. Each R is independently selected from the group consisting of hydrogen, alkyl, halogenated alkyl, phenyl and halogenated phenyl groups. The alkyl groups can contain from 1 to about 6 carbon atoms, preferably from 1 to about 3 carbon atoms, and can be either straight chain or branched. The halogenated groups can contain from 1 to about 5 halogen substituents, preferably from 1 to about 3 halogen substituents, said halogen substituents being selected from the group comprising chlorine and bromine, preferably bromine. It is also preferred that R be hydrogen. Further, it is preferred that all R groups be identical. X is selected from the group comprising chlorine and bromine, preferably bromine, and n is an integer from 1 to 3, preferably 2. For purposes of illustration only, Table I is designed to further help describe the compounds of formula I and is neither meant nor should it be taken to be a complete listing of all the compounds within the scope of formula I.

TABLE I

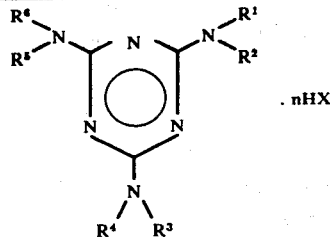

| Compound | R¹ | R² | R³ | R⁴ | R⁵ | R⁶ | n | X |
|---|---|---|---|---|---|---|---|---|
| 1 | H | H | H | H | H | H | 1 | Cl |
| 2 | 〃 | 〃 | 〃 | 〃 | 〃 | 〃 | 1 | Br |
| 3 | 〃 | 〃 | 〃 | 〃 | 〃 | 〃 | 2 | Cl |
| 4 | 〃 | 〃 | 〃 | 〃 | 〃 | 〃 | 2 | Br |
| 5 | 〃 | 〃 | 〃 | 〃 | 〃 | 〃 | 3 | Cl |
| 6 | 〃 | 〃 | 〃 | 〃 | 〃 | 〃 | 3 | Br |
| 7 | CH₂CHBrCH₂Br | CH₂CHBrCH₂Br | CH₂CHBrCH₂Br | CH₂CHBrCH₂Br | CH₂CHBrCH₂Br | CH₂CHBrCH₂Br | 1 | Br |
| 8 | 〃 | 〃 | 〃 | 〃 | 〃 | 〃 | 1 | Cl |
| 9 | 〃 | 〃 | 〃 | 〃 | 〃 | 〃 | 2 | Br |
| 10 | 〃 | 〃 | 〃 | 〃 | 〃 | 〃 | 2 | Cl |
| 11 | H | Br-C₆H₄- | H | Br-C₆H₄- | H | Br-C₆H₄- | 1 | Br |
| 12 | 〃 | 〃 | 〃 | 〃 | 〃 | 〃 | 1 | Cl |
| 13 | 〃 | 〃 | 〃 | 〃 | 〃 | 〃 | 2 | Br |
| 14 | 〃 | 〃 | 〃 | 〃 | 〃 | 〃 | 2 | Cl |
| 15 | CH₃ | CH₃ | CH₃ | CH₃ | CH₃ | CH₃ | 1 | Br |
| 16 | 〃 | 〃 | 〃 | 〃 | 〃 | 〃 | 1 | Cl |
| 17 | 〃 | 〃 | 〃 | 〃 | 〃 | 〃 | 2 | Br |
| 18 | 〃 | 〃 | 〃 | 〃 | 〃 | 〃 | 2 | Cl |
| 19 | H | CH₂CHClCH₂CCl₃ | H | CH₂CHClCH₂CCl₃ | H | CH₂CHClCH₂CCl₃ | 1 | Br |
| 20 | 〃 | 〃 | 〃 | 〃 | 〃 | 〃 | 1 | Cl |
| 21 | 〃 | 〃 | 〃 | 〃 | 〃 | 〃 | 2 | Br |
| 22 | 〃 | 〃 | 〃 | 〃 | 〃 | 〃 | 2 | Cl |
| 23 | C₂H₅ | H | C₂H₅ | H | C₂H₅ | H | 1 | Br |
| 24 | 〃 | 〃 | 〃 | 〃 | 〃 | 〃 | 1 | Cl |
| 25 | 〃 | 〃 | 〃 | 〃 | 〃 | 〃 | 2 | Br |
| 26 | 〃 | 〃 | 〃 | 〃 | 〃 | 〃 | 2 | Cl |
| 27 | H | 2,4-Br₂-C₆H₃- | H | 2,4-Br₂-C₆H₃- | H | 2,4-Br₂-C₆H₃- | 1 | Br |
| 28 | 〃 | 〃 | 〃 | 〃 | 〃 | 〃 | 1 | Cl |
| 29 | 〃 | 〃 | 〃 | 〃 | 〃 | 〃 | 2 | Br |
| 30 | 〃 | 〃 | 〃 | 〃 | 〃 | 〃 | 2 | Cl |
| 31 | C₆H₁₂Br | H | C₆H₁₂Br | H | C₆H₁₂Br | H | 2 | Br |
| 32 | CH₃ | C₆H₅ | CH₃ | C₆H₅ | CH₃ | C₆H₅ | 2 | Cl |
| 33 | CH₂CH₂Cl | CH₂CH₂Cl | CH₂CH₂Cl | CH₂CH₂Cl | CH₂CH₂Cl | CH₂CH₂Cl | 3 | Cl |
| 34 | CH₂Br | CH₂Br | CH₂Br | CH₂Br | CH₂Br | CH₂Br | 3 | Br |
| 35 | C₄H₈Br | H | C₄H₈Br | H | C₄H₈Br | H | 1 | Br |

The following is a partial listing of those preferred compounds within the scope of formula I: melamine monohydrochloride, 2,4,6-tris(2′,3′-dibromopropylamino)-s-triazine monohydrochloride, 2,4,6-tris(2′,4′,6′-tribromoanilino)-s-triazine monohydrochloride, 2,4,6-tris(dimethylamino)-s-triazine monohydrochloride, 2,4,6-tris-(2′,4′,4′,4′-tetrachlorobutylamino)-s-triazine monohydrochloride 2,4,6-tris(ethylamino)-s-triazine monohydrochloride and their monohydrobromide, dihydrochloride, and dihydrobromide analogues.

The flame retardant compounds within the scope of this invention can be generally prepared as follows. The desired substituted s-triazine is added to an acidic solution containing the desired hydrohalide or hydrohalidemixture in the appropriate concentration. In order to increase hydrogen halide content of said acidic solution, one can concentrate the acidic solution by evaporating it or can add thereto any desired anhydrous hydrogen halide. This acidic mixture containing excess hydrohalide is refluxed for 1 to 1.5 hours. The refluxed acidic medium is then cooled to room temperature by any convenient method, e.g., using an ice bath or allowing it to be exposed to ambient temperatures. The solid product is filtered. Said solid product can be optionally washed with water or any suitable organic solvent, e.g., acetone. The product is then dried at from about 100° to about 130° C. until constant weight is achieved.

The flame retardants within the scope of this invention as well as mixtures thereof can be used in combination with virtually any polyolefin polymeric material. Among the polyolefin polymers with which the flame retardants of this invention may be combined may be mentioned, for example, homopolymers of ethylene, propylene, butene, and hexene, copolymers of two or more monomers and copolymers of one or more such olefinic monomers with other copolymerizable non-olefinic monomers, e.g., ethylene/propylene copolymers, ethylene/butene copolymers, ethylene/hexene copolymers, ethylene/vinyl acetate copolymers, ethylene/acrylate esters (for example ethylacrylate) copolymers, and ethylene/carboxylic acids (for example, acrylic acid, methacrylic acid, etc.) copolymers. A preferred class of polyolefin polymers which can be used with the flame retardants of formula I may be mentioned, polyethylene, including both the low density and high density polyethylene, polypropylene and copolymers thereof. A further description of polyolefin polymers capable of being used in this invention can be found in Modern Plastics Encyclopedia, Vol. 52, No. 10A, pp. 52 through 54, 62 through 71, 77 through 79, 113 through 115, 138 through 141, McGraw-Hill, Inc., New York, N.Y. (1975), said publication being incorporated herein in toto by reference.

It is also contemplated that the flame retardants of formula I will display flame retardant efficacy when incorporated into or applied onto polyester, polyamide, polystyrene, and epoxy polymeric compositions.

The flame retardants of this invention can be incorporated into or applied onto virtually any flammable polyolefin polymeric material by techniques which are standard or known to those skilled in the art. See, for example, J. M. Lyons, "The Chemistry and Uses of Fire Retardants," Wiley-Interscience, New York, 1970, and Z. E. Jolles, "Bromine and Its Compounds," Academic Press, New York, 1966. Depending on the substrate and the amount of flame retardancy desired, up to about 35 weight percent of the flame retardant compound of formula I within the scope of this invention can be incorporated therewith. However, in most applications it is preferred to use less than 25 weight percent of said compounds within the scope of this invention. It should be noted that the optimum level of additive of the flame retardant I within the scope of this invention depends upon the particular substrate being treated as well as the level of flame retardancy desired. For example, in polypropylene a flame retardant load level of from about 5 to about 30 percent by weight of the total polymeric composition is satisfactory.

In addition to the flame retardant compounds within the scope of this invention, the flame retardancy of a polymer can be further enhanced through the use of so-called "synergists" or enhancing agents which when used with the compounds of formula I promote a cooperative effect therebetween and thus enhance the flame retardancy of the resultant polyolefin polymeric composition as compared to the flame retardancy of either one component used separately. These "enhancing agents" comprise the oxides and halides of groups IVA and VA of the Periodic Table, i.e., oxides and halides of antimony, bismuth, arsenic, tin, lead, germanium, e.g., antimony oxychloride, antimony chloride, antimony oxide, stannic oxide, stannic chloride, arsenous oxide, arsenous chloride, and the like; and organic and inorganic compounds of phosphorus, nitrogen, boron, and sulfur, e.g., triphenyl phosphate, ammonium phosphate, zinc borate, thiourea, urea, stannic sulfide, and the like and oxides and halides of titanium, vanadium, chromium, manganese, iron, niobium, molybdenum copper, zinc, magnesium, e.g., titanium dioxide, titanium chloride, vanadium pentoxide, chromic bromide, manganous oxide, molybdenum trioxide, ammonium molybdate; and hydrates of the above, e.g., stannic oxide hydrate, lead hydrate; and combinations thereof. The preferred enhancing agents are the oxides of antimony, arsenic and bismuth. However, any compound which on decomposition, as by ignition, yields these oxides would be suitable. Thus some organic antimonates are preferred. The enhancing agents disclosed in U.S. Pat. No. 3,205,196 are also suitable for use.

U.S. Pat. No. 3,205,196, column 2, states that, "Antimony oxide is the antimony compound that is presently preferred for use in the present invention. However, many antimony compounds are suitable, inorganic antimony compounds include antimony sulfide sodium antimonite, potassium antimonite, and the like. Many organic antimony compounds are suitable such as the antimony salts of organic acids and their pentavalent derivatives disclosed in copending application Ser. No. 688,143, filed Oct. 4, 1957, now U.S. Pat. No. 2,966,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonous acids and their pentavalent derivatives disclosed in copending application Ser. No. 688,108, filed Oct. 4, 1957, now Pat. No. 2,993,924, such as tris(n-octyl)antimonite, tris(2-ethylhexyl)antimonite, tribenzyl antimonite, tris($\beta$-chloroethyl)antimonite, tris($\beta$-chloropropyl)antimonite, tris($\beta$-chlorobutyl)antimonite and their pentavalent compounds are the cyclic antimonites such as trimethylolpropane antimonite, pentaerythritol antimonite, and glycerol antimonite. The corresponding arsenic and bismuth compounds can also be employed."

It is to be understood that such patents as U.S. Pat. No. 3,205,196; U.S. Pat. No. 2,996,528 and U.S. Pat. No. 2,993,924 are to be considered as incorporated herein by reference for all intents and purposes. Without limitation, preferred enhancing agents include $Sb_2O_3$, $SbCl_3$, $SbBr_3$, $SbI_3$, $SbOCl$, $As_2O_3$, $As_2O_5$, $ZnBO_4$, $BaB_2O_4.H_2O$, $2.ZnO.3B_2O_3.3.5H_2O$ and stannous oxide hydrate. The more preferred enhancing agent is antimony trioxide.

The amount of synergist can, like the flame retardants within the scope of this invention, be used in any amount, taking into account the effect that large amounts of the material may have upon the properties of the polymeric composition. Customarily, the synergist can be employed in concentrations as high as 25 percent by weight of the total composition, preferably from about 1 to 15 percent, and more preferably from about 2 to 10 percent, by weight of the total composition. One level of synergist which is often used is an amount which is from about 25 to about 75 percent, preferably from about 33 to 67 percent, by weight of the flame retardants within the scope of this invention.

It is also within the scope of this invention to employ other materials in the present invention compositions where one so desires to achieve a particular end result. Such materials include, without limitation, adhesion promotors; antioxidants; antistatic agents; antimicrobials, colorants; flame retardants such as those listed on pages 665–668, Modern Plastics Encyclopedia, ibid., (in addition to the new class of flame retardants described herein); heat stabilizers; light stabilizers; pigments; plasticizers; preservatives; ultraviolet stabilizers and fillers.

In this latter category, i.e., fillers, there can be mentioned, without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including filler, are more fully described in Modern Plastics Encyclopedia, ibid., and which publication has been incorporated herein in toto by reference.

The amount of the above described materials employed in the present invention compositions can be any quantity which will not substantially adversely affect the desired results derived from the present invention compositions. Thus, the amount used can be zero (0) percent, based on the total weight of the composition, up to that percent at which the composition can still be classified as a plastic. In general, such amount will be from about 0% to about 75% and more specifically from about 1% to about 50%.

The following examples are provided for the purpose of further illustration only and are not intended to be limitations on the disclosed invention. Unless otherwise specified, all temperatures are expressed in degrees centigrade; all weights are expressed in grams; and all volumes are expressed in milliliters.

EXAMPLE 1

Preparation of melamine dihydrobromide:

A charge of 1,700 grams of 48 percent hydrobromic acid solution was placed into a five-liter, three-neck flask fitted with a mechanical stirrer, a thermometer, and a reflux condenser. Into said flask was then added 252 grams of melamine and the reaction mixture was heated to reflux. The reflux condition was maintained for one hour. The reaction flask was then exposed to ambient temperatures for about 16 to 17 hours. The reaction product was filtered. Said filtered product was dried at 110° C. for 44 hours. Yield: 573 grams of melamine dihydrobromide (99.5 percent yield). Percent bromine calculated: 55.5%, percent bromine found: 55.8%.

EXAMPLE 2

Preparation of melamine monohydrochloride:

A charge of 500 grams of 37.7 percent hydrochloric acid was placed into a 500 milliliter, 3-neck flask fitted with a mechanical stirrer, a thermometer, and a reflux condenser. Into said reaction flask was then added 63 grams of melamine. The reaction mixture was heated to reflux and maintained at reflux for 1.5 hours. The reaction flask was then exposed to room temperature for a 16 to 17 hour period. The reaction product was filtered and washed with 300 milliliters of deionized water. The washed product was dried at 110° C. for 20 hours. Yield: 71 grams of melamine monohydrochloride (yield: 87.4%). Percent chlorine calculated: 21.8%; percent chlorine found: 22.6%.

EXAMPLE 3

The thermal stability of melamine dihydrobromide (prepared in Example 1, supra), melamine monohydrochloride (prepared in Example 2, supra), melamine, and trichloromelamine (the latter two having been purchased from Aldrich Chemical Co., Inc., Milwaukee, Wisconsin, and reported to have a purity of 99% and 98%, respectively) was determined by the procedure set forth in section 9–951, "Thermogravimetric Analyzer," of "Instruction Manual 990, Thermal Analyzer and Modules," E. I. du Pont de Nemours and Co. (Inc.), Instrument Products Division, Wilmington, Delaware 19898. The results of the thermographic analysis (TGA) of the four compounds at several different weight losses is tabulated in Table II.

TABLE II

| | TGA Results Temperature at which Weight Change Occurs, ° C. | | | |
|---|---|---|---|---|
| Weight Loss | melamine dihydrobromide | melamine monohydrochloride | melamine | trichloromelamine |
| 1% | 240 | 255 | 262 | 180 |
| 5% | 275 | 301 | 297 | 197 |
| 10% | 293 | 318 | 311 | 200 |
| 25% | 317 | 375 | 333 | 202 |
| 50% | 342 | 467 | 353 | 207 |

Table II clearly indicates that the flame retardant compounds within the scope of this invention as represented by melamine dihydrobromide and melamine monohydrochloride possess excellent thermal stability. This excellent thermal stability of the compounds within the scope of this invention has significant commercial implications. The excellent thermal stability enables the compounds within the scope of this invention to be processed without significant weight losses at temperatures wherein many prior commercial flame retardants exhibited substantial weight losses such that said commercial compounds are undesirable. For example, polypropylene is typically processed at 204° C. and molded at 232° C. Because the compounds within the scope of this invention as shown by melamine dihydrobromide and melamine monohydrochloride, do not exhibit any weight loss under approximately 240° and 255° C., respectively, these materials can be effectively used as flame retardants for polypropylene and other high temperature processed materials. The following example clearly indicates the above. Trichloromelamine was not compounded in polypropylene because its poor TGA results render it a commercially unfeasible flame retardant for polypropylene and the desire to avoid exposure to the toxic chlorine gases which would be evolved during processing.

EXAMPLE 4

Melamine dihydrobromide (40% of the total mixture by weight) was dry mixed with polypropylene resin (60% by weight) (Hercules 6823 brand polypropylene, Hercules, Inc., Wilmington, Delaware). The mixture was melt blended in a compounding machine under the following conditions: temperature: 410° F.; rpm: 120; and mixing time: 2 to 3 minutes (Prep-Center brand compound machine, C. W. Brabender Instruments, Inc., S. Hackensack, New Jersey). The discharge mass was cooled, ground, let down to a flame retardant load level of 20% by weight melamine dihydrobromide and 5% by weight antimony oxide by dry blending the ground concentrate discharge mass with a polypropylene resin, containing 30% by weight antimony oxide prepared using the same parameters as above, and then injection molded using a 30-ton Newbury 1 ounce injection molding machine under the following parameters: screw speed: 250 rpm; injection pressure: initial: 2000 pounds per square inch (psi); internal barrel temperature: rear zone: 410° F., front zone: 440° F.; cycle time: 60 seconds (sec.); total injection time: 20 sec.; total stroke time: 4 sec. The final polypropylene polymeric composition was subjected to various tests and the data obtained therefrom are reported in Table III.

The same processing conditions as above, except that the compounding machine was run at 100 rpm and a temperature of 428° F., were used to prepare additional polypropylene samples having different flame retardant and antimony oxide load levels as well as different flame retardant additives in some instances. The difference in temperature and rpm of the compounding machine has no impact on the flame retarding efficacy of the various additives. Using the same injection molding conditions as above, save that the total stroke time was 5 sec., additional polypropylene polymeric samples were prepared without any flame retardant additive present. The absence of the prior melt blending step and the change in total stroke time have no impact on the flame retarding efficacy of the polypropylene base resin. These samples were tested in the same manner and the results obtained are also reported in Table III.

TABLE III

| Flame Retardant Efficacy in Polypropylene | | |
|---|---|---|
| Flame Retardant | FR/Sb Load Level[1] | OI, percent[2] |
| Control | 0/0 | 17.0 |
| Melamine | 25/0 | 21.5 |
|  | 20/5 | 20.5 |
| Melamine Monohydrochloride | 20/5 | 24.5 |
| Melamine Dihydrobromine | 25/0 | 30.0 |
|  | 20/5 | 28.0 |

[1]FR/Sb Load Level means Flame Retardant/-Antimony Oxide Load Level.
[2]Oxygen Index, ASTM D-2863-70.

As Table III clearly indicates, the compounds within the scope of this invention, as exemplified by melamine dihydrobromide and melamine monohydrochloride, possess excellent flame retardant efficacy in polyolefins, as exemplified by polypropylene. Exemplary flame retardants within the scope of formula I which also display excellent flame retardant efficacy in polyolefins include melamine monohydrochloride, 2,4,6-tris(2',3'-dibromopropylamino)-s-triazine monohydrochloride, 2,4,6-tris(2',4',6'-tribromoanilino)-s-triazine monohydrochloride, 2,4,6-tris(dimethylamino)-s-triazine monohydrochloride, 2,4,6-tris(ethylamino)-s-triazine monohydrochloride and their monohydrobromide, dihydrochloride, and dihydrobromide analogues.

Based on this disclosure, many other modifications and ramifications will naturally suggest themselves to those skilled in the art. These are intended to be comprehended as within the scope of this invention.

The embodiments of the invention in which an exclusive property or privilege is claimed are defined as follows:

1. A flame retarded polyolefin polymer containing a flame retarding amount of a compound of the formula:

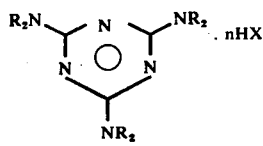

wherein each R is independently selected from a group consisting of hydrogen, alkyl, halogenated alkyl, phenyl, and halogenated phenyl groups, said alkyl groups containing from 1 to about 6 carbon atoms and said halogenated groups containing from 1 to about 5 halogen substituents per group, said halogen substituents selected from a group consisting of chlorine and bromine; wherein X is selected from a group consisting of chlorine and bromine; and wherein n is an integer from 1 to 3, and mixtures thereof.

2. The polyolefin polymer according to claim 1 wherein each R is independently selected from the group consisting of hydrogen, alkyl, halogenated alkyl, phenyl, and halogenated phenyl, said alkyl groups containing from 1 to about 3 carbon atoms and said halogenated groups containing from 1 to about 3 halogen substituents per group.

3. The polyolefin polymer according to claim 2 wherein all R groups are identical.

4. The polyolefin polymer according to claim 3 wherein X is bromine.

5. The polyolefin polymer according to claim 4 wherein n is 2.

6. The polyolefin polymer according to claim 2 wherein X is bromine.

7. The polyolefin polymer according to claim 6 wherein n is 2.

8. The polyolefin polymer according to claim 1 wherein each R group is hydrogen.

9. The polyolefin polymer according to claim 1 wherein said polyolefin is polypropylene.

10. The polyolefin polymer according to claim 1 wherein said compound is selected from the group consisting of melamine monohydrochloride, 2,4,6-tris(2',2'-dibromopropylamino)-s-triazine monohydrochloride, 2,4,6-tris(2',4',6'-tribromoanilino)-s-triazine monohydrochloride, 2,4,6-tris(dimethylamino)-s-triazine monohydrochloride, 2,4,6-tris(2',4',4',4'-tetrachlorobutylamino)-s-triazine monohydrochloride, 2,4,6-tris(ethylamino)-s-triazine monohydrochloride, 2,4,6-tris(ethylamino)-s-triazine monohydrochloride and their monohydrobromide, dihydrochloride, and dihydrobromide analogues.

11. A flame retardant polymeric composition consisting essentially of a polyolefin polymer and a flame retarding amount of a compound of the formula:

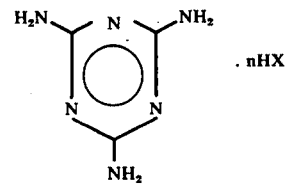

wherein X is chlorine and bromine; and wherein n is an integer from 1 to 3, and mixtures thereof.

* * * * *

UNITED STATES PATENT OFFICE
CERTIFICATE OF CORRECTION

PATENT NO. : 4,028,333
DATED : June 7, 1977
INVENTOR(S) : Michael W. Lindvay

It is certified that error appears in the above-identified patent and that said Letters Patent are hereby corrected as shown below:

Column 10, line 36 (the same being line 4 of Claim 10)

after tris(2', delete "2'" and insert ---3'---.

Column 10, line 42 (the same being line 10 of Claim 10)

delete "2,4,6-tris(ethylamino)-s-triazine monohydrochloride".

Signed and Sealed this

Sixth Day of June 1978

[SEAL]

Attest:

RUTH C. MASON
Attesting Officer

DONALD W. BANNER
Commissioner of Patents and Trademarks